United States Patent [19]
Ozeki

[11] 4,072,405
[45] Feb. 7, 1978

[54] PRISM SYSTEM FOR USE IN TRICOLOR SEPARATION

[75] Inventor: Banri Ozeki, Tokyo, Japan

[73] Assignee: Tokina Optical Co., Ltd., Tokyo, Japan

[21] Appl. No.: 766,005

[22] Filed: Feb. 7, 1977

Related U.S. Application Data

[63] Continuation of Ser. No. 586,703, June 13, 1975, abandoned.

[30] Foreign Application Priority Data

June 13, 1974 Japan .................................. 49-66590

[51] Int. Cl.$^2$ .................... G02B 27/14; H04N 9/04
[52] U.S. Cl. ............................... 350/173; 358/5 S
[58] Field of Search ................... 350/173; 358/5 S

[56] References Cited

U.S. PATENT DOCUMENTS

| | | | |
|---|---|---|---|
| 2,189,933 | 2/1940 | B all et al. ..................... | 350/173 |
| 3,602,637 | 8/1971 | Katsuta et al. .................. | 350/173 |
| 3,610,818 | 10/1971 | Bachmann ....................... | 350/173 |

Primary Examiner—Jon W. Henry
Attorney, Agent, or Firm—Watson, Cole, Grindle & Watson

[57] ABSTRACT

A prism system is utilized in tricolor separation in order to obtain three images of separated colors by passing through the prism a light beam from a single objective lens system. The prism system includes first, second and third prisms, each having the same refractive index. First and second interference filters are utilized in conjunction with the prisms in order to provide reflecting lights and transmitted lights that are complementary to each other. The first prism is a right-angled triangular prism having a vertical angle of 30°, with its oblique surface being disposed at a right angle to the optical axis of the objective lens system. The second and third prisms are each of a trapezoidal shape, having the identical size. Two adjoining angles of the trapezoidal prisms are 90° and the other two angles are 60° and 120°, respectively as viewed in their cross sections. The second prism has a bottom surface which is bonded through the medium of the first interference filter to the base surface of the first prism. The oblique surface of the third prism being bonded through the second interference filter to the oblique surface of the second prism, with the top and bottom surfaces of the third prism being in parallel with the optical axis.

4 Claims, 1 Drawing Figure

PRISM SYSTEM FOR USE IN TRICOLOR SEPARATION

This is a continuation, of application Ser. No. 586,703 filed June 13, 1975 now abandoned.

BACKGROUND OF THE INVENTION

This invention relates to a prism system for use in tricolor separation such as in the field of color television or color photography, where an image obtained through a single objective lens system is separated into images of the three primary colors.

In a television, there have been proposed two types of systems for obtaining image signals. The first system is one in which an image light obtained from a single objective lens system is passed through a striped filter into a single image pick-tube to thereby obtain image signals. In the second system, an image light obtained from a single objective lens system is separated by means of the tricolor separating prism system into three images of the three primary colors. Subsequently, each of the separated images is introduced into a respective image pick-up tube to obtain image signals of each of the three primary colors, which is then followed by photosynthesis, thereby obtaining color image signals. This latter system is used for obtaining a color picture.

There have been proposed various kinds of tricolor separating prism systems for obtaining color images in accordance with this second type of system. These systems, however, suffer from several disadvantages. These disadvantages arise from the fact that the three prisms used each have different shapes, or another subsidiary prism is needed in addition to the three prisms, or air gaps are interposed between each of the adjacent surfaces of the prisms, i.e., the opposing surfaces of the adjoining prisms are not abutting with each other.

These factors in turn increase the complexity of construction of the tricolor separating prism system, thereby resulting in a more costly system.

SUMMARY OF THE INVENTION

An object of the present invention is to provide a prism system for use in tricolor separation which is free of the disadvantages discussed above with respect to previously known systems.

Another object of the present invention is to provide a prism system for use in tricolor separation, in which three prisms are bonded to each other through the medium of interference filters, each of which provides reflecting light and transmitted light that are complementary to each other, thus presenting a prism system of a single block form.

A further object of the present invention is to provide a prism system having three prisms for use in tricolor separation, in which each angle formed by the adjoining surfaces of the three prisms in an angle of an integral multiple of 30°, with the three prisms being bonded to each other through the medium of interference filters, thereby presenting a prism system of a single block form.

It is still another object of the present invention to provide a prism system for use in tricolor separation, in which three prisms, including two prisms of identical size and shape, are bonded to each other through the medium of interference filters, thereby presenting a prism system of a single block form.

It is still a further object of the present invention to provide a prism system for use in tricolor separation, in which three prisms including two prisms of identical size and shape are bonded to each other through the medium of first and second interference filters, which provide reflecting lights and transmitted lights that are complementary to each other, thereby presenting a prism system in a single block form.

In order to accomplish the above-mentioned objectives, the prism system of the present invention includes first, second and third prisms having equal refractive indexes, and first and second interference filters which provide reflecting lights and transmitted lights that are complementary to each other. The first prism is a right-angled triangular prism having a vertical angle of 30° in its cross section. The oblique surface of the first prism is disposed at a right angle to the optical axis of an objective lens system. The second and third prisms are both of a trapezoidal shape of the identical size in their cross section. The top and bottom surfaces of each of the second and third prisms are in parallel to each other. The third surfaces of the second and third prisms are provided at right angles with the parallel top and bottom surfaces. The fourth surface, which is the oblique surface is provided at angles of 60° and 120° with the parallel top and bottom surfaces, with respect to the cross section. The bottom surface of the second prism is bonded through the medium of the first interference filter to the base surface of the first prism, which base surface forms the vertical angle of the triangular first prism. The third prism has its top and bottom surfaces aligned parallel to the optical axis. The oblique surface of the third prism is bonded through the medium of the second interference filter to the oblique surface of the second prism.

More particularly in utilizing this prism system, an image light passing through the objective lens system is incident on the oblique surface of the first prism at a right angle to such surface. This light is then divided into a reflecting light and a transmitted light by means of the first interference filter. The reflecting light is then internally reflected, with its optical axis being in parallel with the first interference filter but at a right angle to one of the base surfaces of the first prism. The transmitted light meanwhile passes through the first interference filter and is further divided by the second interference filter into a reflecting light and a transmitted light, which runs along the optical axis of the objective lens, with the reflecting light and transmitted light being complementary to each other. The optical axis of the reflecting light is in parallel with the top and bottom surfaces of the second prism but at a right angle to the third surface, which forms right angles with the top and bottom surfaces. This reflecting light is then emitted through the second prism. Meanwhile the transmitted light passing through the second interference filter is emitted through the third prism along the optical axis of the objective lens but at a right angle to the third surface, which forms right angles with the top and bottom surfaces of the third prism. In this manner tricolor separation is achieved.

The first and second interference filters are respectively arranged to form angles of 60° and 120° with the optical axis of the objective lens. The first interference filter reflects one light of a color having a wave length range of, for instance, a blue wave length range (below 490 mµ) of the three primary colors of the white light entering through the objective lens and incident upon this filter. The light of the other colors are allowed to be transmitted through the first interference filter. The second interference filter reflects the second image light of a red wave length range (over 570 mµ) of the white light devoid of the light of the blue wave length range. This second image light is thus emitted into the second prism. The light transmitted through the second interference filter is then emitted as the third image light of the green wave length range (490 mµ to 570 mµ) of the white light, which is devoid of the lights of the blue and red wave length ranges. Thus, the three images are obtained as that of the three primary colors.

In turn, the light receiving surfaces of first, second and third vidicons are placed on the respective focusing planes. In this manner, there may be achieved a desired image of the three primary colors of a photographic object.

During this operation, the first image light is reflected two times on the first interference filter and the oblique surface of the first prism. The second image light is reflected on the second interference filter once. The third image light is subjected to no reflection. Consequently, the second image is obtained as a mirror image in contrast to the first and third images. In the case of a color television, however, normal image signals of the three primary colors can still be obtained if the scanning of the image surface of the second vidicon is merely reversed.

BRIEF DESCRIPTION OF THE DRAWING

The FIGURE is a side sectional view illustrating the essential components of one embodiment of a tricolor separating prism system according to the present invention.

DESCRIPTION OF THE PREFERRED EMBODIMENT

Figure 1:
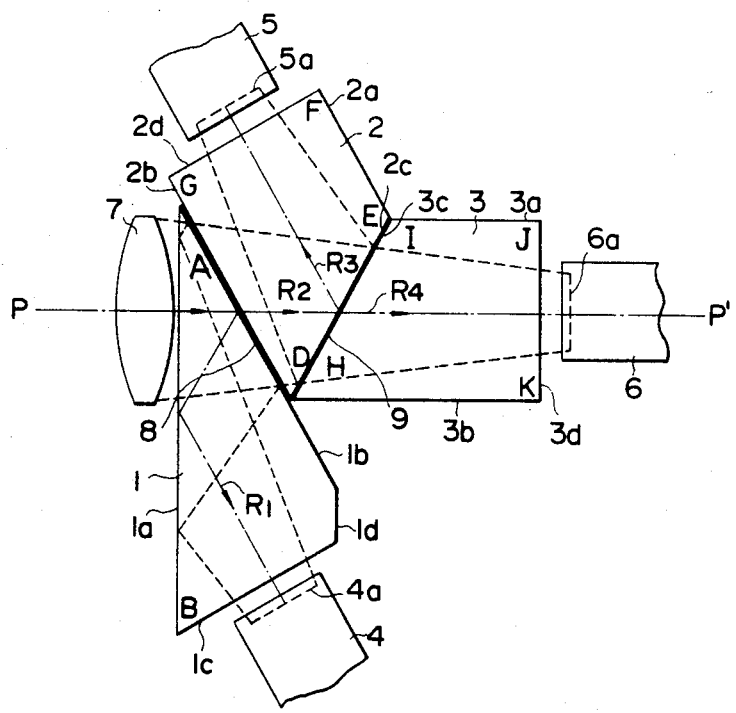

Referring now to the single FIGURE, an objective lens system 7 is schematically illustrated in the form of a single lens, although a plurality of lenses actually would be utilized. The optical axis of the objective lens is shown by the chain line P—P'.

The tricolor separating prism system includes three prisms, 1, 2 and 3, which are disposed on the image side of objective lens 7, i.e., first prism 1, second prism 2 and third prism 3. First prism 1 is a right-angled triangular prism having a vertical angle of 30°, in its cross section, while second prism 2 and third prism 3 are of a trapezoidal shape and are of the identical size.

First prism 1 faces the surface of the rearmost lens of the objective lens system 7, with its oblique surface 1a facing at a right angle to the optical axis P—P'. The base surface 1b of the first prism forms a vertical angle A intersecting with the optical axis at an angle of 60° and is spaced at a greater distance from the objective lens system than is oblique surface 1a. A further oblique surface 1d is a cut surface bounded by base surface 1b and a further base surface 1c at its opposite edges. Oblique surface 1d can be provided for rendering the first prism more compact in size.

Second prism 2, which is of a trapezoidal shape, is defined by top surface 2a and bottom surface 2b, which extend in parallel with each other, a surface 2d intersecting with those surfaces 2a, 2b at a right angle, and an oblique surface 2c intersecting with top surface 2a and bottom surface 2b at angles of 120° and 60°, respectively. Thus, angle G and angle F are right angles, angle D is 60° and angle E is 120°.

Third prism 3 is similarly defined by top and bottom surfaces 3a and 3b, a surface 3d intersecting surfaces 3a and 3b at right angles and oblique surface 3c intersecting with top and bottom surfaces 3a and 3b at angles of 120° and 60°, respectively. Angles J and K, therefore, are right angles, angle I is 120° and angle H is 60°.

Base surface 1b of the first prism and bottom surface 2b of the second prism are bonded to each other through the medium of a first interference filter 8 which will be described below. On the other hand, oblique surface 2c of the second prism and oblique surface 3c of the third prism are bonded to each other through the medium of a second interference filter 9 which also will be described below.

In manufacturing the prism system, a thin film is coated on base surface 1b of the first prism for forming first interference filter 8 in the form of multilayered structure. These layers can be formed using a vacuum evaporation technique. Subsequently, bottom surface 2b of second prism 2 is bonded to first interference filter 8 with adhesive. Alternatively, the first interference filter can be formed on bottom surface 2b of the second prism in the form of multi-layers in accordance with a vacuum evaporation process. In this case, base surface 1b of first prism 1 is bonded to first interference filter 8.

In a similar manner, second interference filter 9 is formed on oblique surface 2c or 3c, and subsequently oblique surface 2c of second prism 2 is bonded to oblique surface 3c of third prism 3 through second interference filter 9.

Accordingly, first interference filter 8 and second interference filter 9 intersect with the optical axis P—P' of objective lens system 7 at an angle of 60°. Since the optical axis P—P' and the optical axis R2, with prism 2, are placed at an incident angle of 30° to first interference filter 8 and second interference filter 9, there is minimized any change in color of the reflecting light due to the interference of light resulting when the oblique light beam through objective lens 7 is incident on both interference filters 8, 9, respectively.

In other words, if the incident angle is increased, say, to an angle as large as 45°, then there arises a steep increase in the change in the interference color of the oblique light beam because of the polarization of light. This color change is caused results in the function of the tricolor separating prisms being neutralized. In contrast, the present invention minimizes to a practical extent the change in color of the reflecting light due to the polarization of the oblique light beams, by maintaining the incident angle of the optical axis at an angle of 30°. In this manner the only interference is that along the ordinary optical axis.

Accordingly, when a beam of white light is incident on first prism 1 from objective lens system 7 along the optical axis P—P', then the light of a blue wave length is reflected by first interference filter 8 in a downward direction at an angle of 60° with respect to the optical axis. The light is then totally reflected on oblique surface 1a internally of first prism 1 along optical axis R1 of the reflecting light which is in parallel with the surface of first interference 8. Subsequently, the light is emitted from first prism 1 at a right angle to its oblique surface 1c, thereby focusing the first image of the blue color on photoelectric surface 4a of first vidicon 4, which is disposed along the optical axis R1.

The remaining image light including the color components other than the blue light component advances along the optical axis R2, which coincides with the optical axis P—P' of the objective lens system, into second prism 2. In prism 2, the light having a red component is reflected by second interference filter 9 at an angle of 60° with respect to the optical axis P—P', with the optical axis R3 of the reflected light being in parallel with top surface 2a and bottom surface 2b of the second prism. The reflecting light is then emitted from second prism 2 at a right angle to surface 2d, thereby focusing the second image of the red color on photoelectric surface 5a of vidicon 5, which is disposed along optical axis R3.

Finally, the light having a green light component, which is transmitted through second interference filter 9, advances through third prism 3 along optical axis R4 which is coincident with the optical axis P—P' and is at a right angle to surface 3d of the third prism. This final light component is then emitted from the third prism thereby focusing the third image of the green color on photoelectric surface 6a of third vidicon 6, which is disposed along the optical axis R4.

Consequently, vidicons 4, 5, 6 each receive the image light component of the respective colors in the form of image signals which are obtained by scanning and synthesizing these image lights. The second image, however, is a mirror image in contrast to the first and third images, so that second vidicon 5 should reverse the scanning direction of its respective light image with respect to the scanning directions of the first and third vidicons.

It is noted that the above description and the accompanying drawing are provided merely to present an exemplary embodiment of the present invention and that additional modifications of such embodiment are possible within the scope of this invention without deviating from the spirit thereof.

What is claimed is:

1. A prism system for use in tricolor separation, the system comprising:
    a first prism of a right-angled triangular shape, said first prism having an oblique surface end and a first base surface forming an angle of 30° with its oblique surface;
    second and third prisms of a trapezoidal shape, each having parallel top and bottom surfaces, and an oblique surface forming an angle of 120° with its top surface, said oblique surfaces of said second and third prisms being adjacent;
    a first interference filter interposed and bonded between said first base surface of said first prism and said bottom surface of said second prism whereby when light passes through said oblique surface of said first prism at a right angle thereto and is incident upon said first interference filter, light of one wave length range having one of three primary colors reflected by said first interference filter, while light components of the other wave length ranges are allowed to be transmitted through said first interference filter in the same direction as that of the incident light; and
    a second interference filter interposed and bonded between said oblique surface of said second prism and said oblique surface of said third prism, whereby a transmitted light component of another light wave length range of the three primary colors is reflected by said second interference filter, while the remaining light component of the remaining light wave range is transmitted through said second interference filter.

2. A system as defined in claim 1, wherein said second and third prisms each having a remaining surface opposite its oblique surface, said remaining surface intersecting with said top and bottom surfaces at a right angle.

3. A system as defined in claim 2, wherein said second and third prisms are identical in size.

4. A system as defined in claim 2, further comprising: an objective lens having an optical axis extending orthogonally to said oblique surface of said first prism, whereby a first image light having one color of the three primary colors of the image light transmitted through said objective lens is reflected on said first interference filter and then totally reflected on said oblique surface of said first prism and then emitted from said second base surface of said first prism at a right angle to such surface, a second image light having another color of the three primary colors of the image light transmitted through said first interference filter along the optical axis of said objective lens is reflected on said second interference filter and then emitted from said remaining surface of said second prism at a right angle to such surface, and a third image light having the remaining color of the three primary colors is transmitted through said second interference filter along the optical axis of said objective lens and is emitted from said remaining surface of said third prism.

* * * * *